US012257533B2

(12) United States Patent
Durieux

(10) Patent No.: US 12,257,533 B2
(45) Date of Patent: Mar. 25, 2025

(54) FILTERING DEVICE AND SYSTEM, METHOD OF INSTALLING A FILTERING DEVICE AND USE OF A FILTERING DEVICE

(71) Applicant: Aqua Innovation Network Holding B.V., Veessen (NL)

(72) Inventor: Frans Paul Johannes Durieux, Veessen (NL)

(73) Assignee: AQUA INNOVATION NETWORK HOLDING B.V., Veessen (NL)

( * ) Notice: Subject to any disclaimer, the term of this patent is extended or adjusted under 35 U.S.C. 154(b) by 0 days.

(21) Appl. No.: 17/577,446

(22) Filed: Jan. 18, 2022

(65) Prior Publication Data

US 2022/0226755 A1 Jul. 21, 2022

(30) Foreign Application Priority Data

Jan. 19, 2021 (NL) ..................................... 2027343

(51) Int. Cl.
*B01D 29/03* (2006.01)
*B01D 29/64* (2006.01)
*C02F 1/00* (2023.01)
*E03F 5/14* (2006.01)
*C02F 103/00* (2006.01)

(52) U.S. Cl.
CPC ......... *B01D 29/03* (2013.01); *B01D 29/6423* (2013.01); *C02F 1/004* (2013.01); *E03F 5/14* (2013.01); *C02F 2103/005* (2013.01)

(58) Field of Classification Search
CPC ..... B01D 29/03; B01D 29/6423; C02F 1/004; C02F 2103/005; E03F 5/14; E02B 8/026
See application file for complete search history.

(56) References Cited

U.S. PATENT DOCUMENTS 3,919,088 A * 11/1975 Doncer ................ B01D 33/466
210/402
4,396,511 A * 8/1983 Neumann ............... E02B 8/026
210/159
4,780,199 A * 10/1988 Ezzell .................. B01D 29/445
210/162

(Continued)

FOREIGN PATENT DOCUMENTS

EP 0554580 A1 8/1993
EP 0697908 A1 2/1996

(Continued)

OTHER PUBLICATIONS

Search Report and Written Opinion for Application No. NL2027343, dated Aug. 16, 2021, 8 pages.

(Continued)

*Primary Examiner* — Liam Royce
(74) *Attorney, Agent, or Firm* — KDW Firm PLLC

(57) ABSTRACT

The invention relates to a filtering device for filtering fibrous material from water flowing through a channel, the device comprising a sieve, the sieve being arranged at an angle with respect a flow direction defined by the channel. According to the invention, said angle is smaller than 25°. The invention also relates to a method of installing such a filtering device, a system comprising such a filtering device, and the use of such a device.

20 Claims, 5 Drawing Sheets

(56) References Cited

U.S. PATENT DOCUMENTS

| | | | | |
|---|---|---|---|---|
| 5,034,122 | A * | 7/1991 | Wiesemann | B01D 29/445 |
| | | | | 209/205 |
| 2007/0278143 | A1 * | 12/2007 | Griffin | B01D 29/035 |
| | | | | 210/323.1 |
| 2012/0175294 | A1 * | 7/2012 | Kim | B01D 33/327 |
| | | | | 210/330 |
| 2015/0027943 | A1 * | 1/2015 | Bernier | B01D 29/445 |
| | | | | 210/330 |
| 2018/0036661 | A1 * | 2/2018 | Anthony | B01D 29/03 |

FOREIGN PATENT DOCUMENTS

| | | | | |
|---|---|---|---|---|
| FR | 2344501 | A1 | 10/1977 | |
| FR | 2975305 | A1 * | 11/2012 | B01D 29/03 |
| GB | 2559976 | A | 8/2018 | |

OTHER PUBLICATIONS

STOWA (The Foundation of Applied Water Research), "Influent fijnzeven in RWZI's" 2010-19 pp. 1-110.

* cited by examiner

FILTERING DEVICE AND SYSTEM, METHOD OF INSTALLING A FILTERING DEVICE AND USE OF A FILTERING DEVICE

CROSS-REFERENCE TO RELATED APPLICATIONS

This application claims priority under 35 U.S.C. § 119 to Netherlands patent application serial number 2027343, filed Jan. 19, 2021, the entirety of which application is incorporated by reference herein.

BACKGROUND

The invention relates to a filtering device for filtering fibrous material from water flowing through a channel, the device comprising a sieve, the sieve being arranged at an angle with respect a flow direction defined by the channel.

Filtering devices are known for their use of filtering water, in particular municipal waste water. This type of waste water includes a relatively large amount of cellulosic material, often originating from toilet paper. The cellulosic material causes an increased load to water treatment systems, such as biological water treatment systems. In order to reduce the load on such systems, it is therefore possible to filter the cellulosic material from the water before supplying it to said water treatment systems. After treatment by the water treatment systems, water may be released to e.g. surface water. The filtered cellulosic material may also be recovered as resource for various products.

A filtering device is known from EP 0 697 908 B 1, and comprises an endless filtering belt for purifying sewage water. The filtering belt is placed in a closed container comprising water to be filtered. The water is forced through the filter belt. The belt is inclined with respect to the water level, so that a free end rises out of the water. By rotating the belt, filtered material is moved upwards, out of the water. A gutter receives the material.

Although the filtering device of EP 0 697 908 B1 has performed satisfactory at least to some extent, it leaves room for improvement. In particular, the capacity of the filtering device is relatively low. Additionally, pressurized water is used to clean the filter belt, which requires a relatively large amount of power. When a large filter capacity is required, many filtering devices are employed. This adds to the amount of power consumed, but also to other factors such as footprint area and servicing costs.

SUMMARY

It is therefore an object of the invention to provide a filtering device with a higher capacity and/or which requires less power, preferably without compromising filtering performance.

This object is achieved with a filtering device according to the preamble, characterized in that said angle is smaller than 25°, preferably smaller than 20°.

In the prior art, it is known to filter fibrous material from water by placing a sieve at a relatively large angle to the direction of flow. The relatively large angle is usually around 90°, but can be as low as 70°. Fibers of the fibrous material are generally of longitudinal shape, and therefore have a relatively large longitudinal dimension and a relatively small transversal dimension. When carried by a flow of water, the fibers generally align in the direction of flow. When arriving at the sieve, the fibers therefore face the sieve head on i.e. with their longitudinal dimension perpendicular to the sieve and their transversal, smaller dimension substantially corresponding to the plane of the sieve. As such, sieving takes place based on the smaller, transversal dimension of the fibers. Accordingly, relatively small apertures are required in the sieve.

The flow of water is obstructed by the small apertures as well. As such, the capacity per filtering system is relatively low.

By decreasing the above-described angle to below 25° the fibers and the sieve are arranged, not entirely, but substantially coplanar. The larger longitudinal dimension of the fibers therefore projects for a substantial part in the plane of the sieve, so that filtering can take place based on the larger longitudinal dimension. This allows using much larger apertures in the sieve, without substantially compromising the result achieved by filtering. Using the larger apertures brings forth the advantage that water can much more easily pass the sieve. In fact, by virtue of the larger apertures the capacity of the sieve can be increased substantially. It may therefore no longer be necessary to pressurize the infeed and/or the sieve may be made smaller and/or no multiple filtering devices may be required.

The channel may be an open channel, for instance made of concrete. Such channels are used for transporting water, especially in municipal water filtering systems. The filtering device has the advantage that it can be installed in such an open channel, amongst others because pressurization may not be needed.

Of course, other embodiments of the channel may also be suitable, such as a conduit.

The invention also relates to a system including the channel and the filtering device. In that case the device may comprise all the above-described features, alone or in any suitable combination.

The sieve may be oriented upwards out of the horizontal plane, as seen in the flow direction. As the water surface when flowing may be substantially horizontal, e.g. in an open channel, the angle between the sieve and the flow direction may substantially correspond to an angle between the sieve and the horizon.

Although in theory the angle could be as small as 0°, corresponding to a substantially horizontal sieve, the applicant proposes a minimum of 5°, preferably 10°. Accordingly, the end of the sieve will be situated higher than the beginning, for instance above a surface of the water flowing through the sieve. This may allow placing a receptacle at the end of the sieve, below its upper end but above the water surface. The angle could therefore be as small as possible, while still fitting a receptacle under the higher end of the sieve above the water. Also, placing the sieve at a slight angle may allow a filter cake to form on the inflow side of the sieve, which may aid in filtration.

In an embodiment of the filtering device, an aperture size of the sieve is 0.8 mm or larger, preferably 1 mm or larger, more preferably approximately 1.5 mm The applicant has found that sufficient filtration can be achieved with apertures this size at an increased capacity, especially for water containing cellulose, such as municipal waste water.

Effective filtration can also be achieved if the aperture size is limited, for instance to 10 mm, 8 mm or 6 mm Smaller apertures are expected to be more effective. As such, aperture size may be limited to e.g. 4 mm or 2 mm Much larger aperture sizes are ineffective for filtering fibrous material. In particular, it is expect aperture sizes above 15 mm are inadequate.

In another embodiment of the filtering device, the sieve is flat. A flat sieve has the advantage that it is easier and less costly to manufacture and transport. Moreover, a flat sieve guarantees that the above-described angle is constant no matter the water level or the point at which the flow of water reaches the sieve.

The sieve may comprise apertures of substantially circular shape. Circular apertures may be relatively easy to produce and/or clean. In particular, cleaning a sieve with circular apertures may be performed relatively effectively with a wiper such as a brush, as is described below.

The filtering device may comprise mounting means for fixedly connecting the sieve with respect to the channel The mounting means may define a, possibly fixed, orientation of the sieve with respect to the channel In practice, the mounting means have only a single orientation with which they can be mounted to the channel As such, the flow direction, which is defined by the channel, can also be inferred from the mounting means.

In yet another embodiment, the device further comprises at least one wiper which is movable over and/or across the sieve.

The wiper allows cleaning the sieve when an amount of filtered material, also referred to as filter cake, has been collected. The sieve may be stationary with respect to the channel and/or the mounting means, whereas the wiper may be movable. The wiper may move over and/or across the sieve in a direction substantially corresponding to the flow direction, i.e. from a lowest part of the sieve to a highest part of the sieve, thereby discharging the filtered material at the higher end of the sieve.

The wiper may be a brush.

In particular, the device may comprise a sieve cover arranged stationary with respect to the wiper.

The sieve cover may prevent or reduce water flowing through the sieve at the location of the sieve cover. This temporarily and locally reduces the capacity of the sieve. In particular, the sieve cover may be arranged aft of the wiper. As such, the sieve cover may cover a portion of the sieve that has just been wiped. The applicant has found that directly after wiping, the probability of fibrous material passing the sieve is relatively high. Without wishing to be bound by theory, this is attributed to the fact that fibrous material collecting on the inlet side of the sieve aids in filtering. Directly after wiping however, the collected material has been removed, and is therefore not able to aid in filtering. Accordingly, the sieve cover can be used to temporarily prevent fibrous material from exiting through regions of the sieve that have just been wiped, so that fibrous material can build up in that timespan.

Aft of the wiper is herein defined in the direction of motion of the wiper.

The sieve cover may be flat. The sieve cover may be arranged substantially parallel to the sieve.

The sieve cover may be arranged to move over and/or across the sieve at a distance from the sieve, in order to allow an amount, albeit a reduced amount, of water to flow between the sieve and the sieve cover, so that filtered material can build up on the sieve below the sieve cover. Nevertheless the sieve cover still reduces the amount of water allowed to pass the sieve locally.

By limiting the amount of space available between the sieve and the sieve cover, fibrous materials are forced to align with the direction of flow. Enforcing said correct alignment may aid in preventing a relatively large amount of fibers passing through the sieve. It is believed the correct alignment is at least in part caused by causing a flow speed that is locally higher under the sieve cover.

The distance between the sieve cover and sieve may be 5 mm or less, in particular smaller than or approximately 1 mm or 2 mm.

In yet another embodiment of the filtering device, the device further comprises a skimmer for cleaning the wiper. The skimmer may be used to remove filtered material from the wiper, and possibly to discharge it to e.g. a receptacle.

The skimmer may be arranged stationary with respect to the sieve and/or the channel The filtering device may further comprise an actuator for moving the at least one wiper. The actuator may be a synchronous motor. Using a synchronous motor, a relatively small movement speed of the wiper can be achieved. The smaller movement speed ensures the sieve is not wiped to fast and/or often, which could detriment filtering quality. Moreover, a synchronous motor may provide sufficient torque for moving the wiper.

In another embodiment of the filtering device, said device comprises an endless support element configured to be driven in rotation by the actuator, the wiper being fixed with respect to the endless support element.

Using the endless support element, the wiper may be moved over and/or across the sieve repeatedly relatively easily.

The endless support element may be a chain.

The device may further comprise means for preventing and/or limiting tilting of the wiper with respect to the sieve.

Preventing or limiting tilt may increase the effectiveness of the wiper.

Limiting tilting may berein mean limit the out-of-neutral tilt of the wiper with respect to the sieve to maximally 10°, preferably to maximally 5°.

The means for preventing tilting of the wiper may comprise at least one follower mounted to the wiper and at least one guide track for guiding the at least one follower along the at least one track, the follower cooperating with the at least one track in order to prescribe an orientation of the wiper while the follower is guided by the track. For that purpose, the follower may engage the wiper or be fixedly connected thereto.

Using a follower in combination with at least one guide track, the orientation of the wiper can be prescribed in positions corresponding to the guide track, whereas in other positions, i.e. outside the guide track, the wiper can be left free to rotate and/or tilt.

The follower can comprise at least one rotatable wheel arranged to roll in the guide track. Using a wheel limits wear and prevents friction.

In particular, the wiper may be tiltably supported with respect to the skimmer at least while it is in contact with the skimmer. A tilting motion of the wiper with respect to the skimmer can accordingly be used to skim material off the wiper.

For this purpose, the guide track may therefore be configured to prescribe the orientation solely along a section corresponding to the sieve, and stop before or at the skimmer. Practically, the at least one guide track could end near the skimmer, at the furthest end of the sieve as seen in the direction of motion of the wiper. The at least one guide track could begin at or close before the sieve as seen in the direction of motion of the wiper.

The filtering device may further comprise a receptacle arranged at or near a free end of the sieve for receiving filtered fibrous material. By collecting the filtered material in a receptacle, the filtering device may be run longer without requiring servicing and/or cleaning, thereby increasing capacity.

The free end of the sieve could be the higher end of the sieve. Said free end could be above the water level, i.e. the furthest end of the sieve as seen in the flow direction of the water and/or the direction of motion of the wiper.

The receptacle could be placed under the sieve. An open end of the receptacle could be placed under the sieve, but above the water level.

The skimmer may be arranged above the receptacle, so that skimmed material can be received in the receptacle.

The invention also relates to a method of installing a filtering device for filtering fibrous material from water flowing through a channel, the method comprising installing a sieve in the channel at an angle with respect to a flow direction defined by the channel, wherein said angle is smaller than 25°, preferably smaller than 20°.

According to the method, the above-described device can be obtained. The method may therefore relate to a device with all the above-described device features, alone or in any suitable combination. Said device may bring forth the corresponding advantages and effects.

The method may comprise manufacturing the sieve at a location different, for instance remote from, the channel This has the advantage that the sieve can be installed relatively easily in existing or pre-build infrastructure, such as the channel In order to fit the device properly to the channel, the channel may be measured before installation. The device can then be dimensioned so as to fit the channel. Measuring beforehand is particularly important if the channel is a concrete channel often used in municipal water treatment systems, as the tolerance in dimensioning for such systems is often relatively large.

The invention also relates to the use of the above-described device, or of the above-described system, for removing fibers from water. In particular, the water may be municipal or industrial waste water. Municipal waste water may comprise cellulose material, often originating from toilet paper. Industrial waste water from e.g. paper industries or textile industries may also comprise fibrous material.

EXAMPLE 1

A filtering device was installed in a horizontal channel, the device comprising a flat sieve. The sieve was perforated with holes of approximately 1.5 mm in diameter. An angle α between the sieve and the horizontal (i.e. the flow direction of water) was varied. Water comprising toilet paper as fibrous material was flown through the channel and the sieve at a flow rate of 4 m³/h. The percentage of fibrous material removed from the water by the sieve was determined by weight. Measurements were taken when a maximum of filter cake had developed on the sieve. The results are displayed in table 1. The results indicate that at relatively small angles, the amount of fibrous material removed is larger.

TABLE 1

| results for Example 1 | |
| --- | --- |
| angle α (°) | fibrous material removed (%) |
| 15 | 63% |
| 45 | 36% |
| 80 | 25% |

EXAMPLE 2

The tests described in Example 1 were repeated. This time at a sieve having holes of 1 mm diameter and at a flow rate of 2 m³/h. Measurements were taken while the filter cake was developing, halfway between no cake and maximally developed cake. Results are presented in table 2. It is believed the moment of sampling in relation to the development of the filter cake accounts for the perceived reduced efficiency with respect to example 1. The measurements taken during example 2 indicate an optimum occurs below an angle below 20°. It is expected that in similar configurations, the optimum would occur at an angle of below 25°.

TABLE 2

| results for Example 2 | |
| --- | --- |
| angle α (°) | fibrous material removed (%) |
| 10 | 48% |
| 15 | 52% |
| 20 | 40% |

BRIEF DESCRIPTION OF THE DRAWINGS

The invention will be further elucidated with reference to the adhered drawings, in which.

DETAILED DESCRIPTION

Figure 1A:
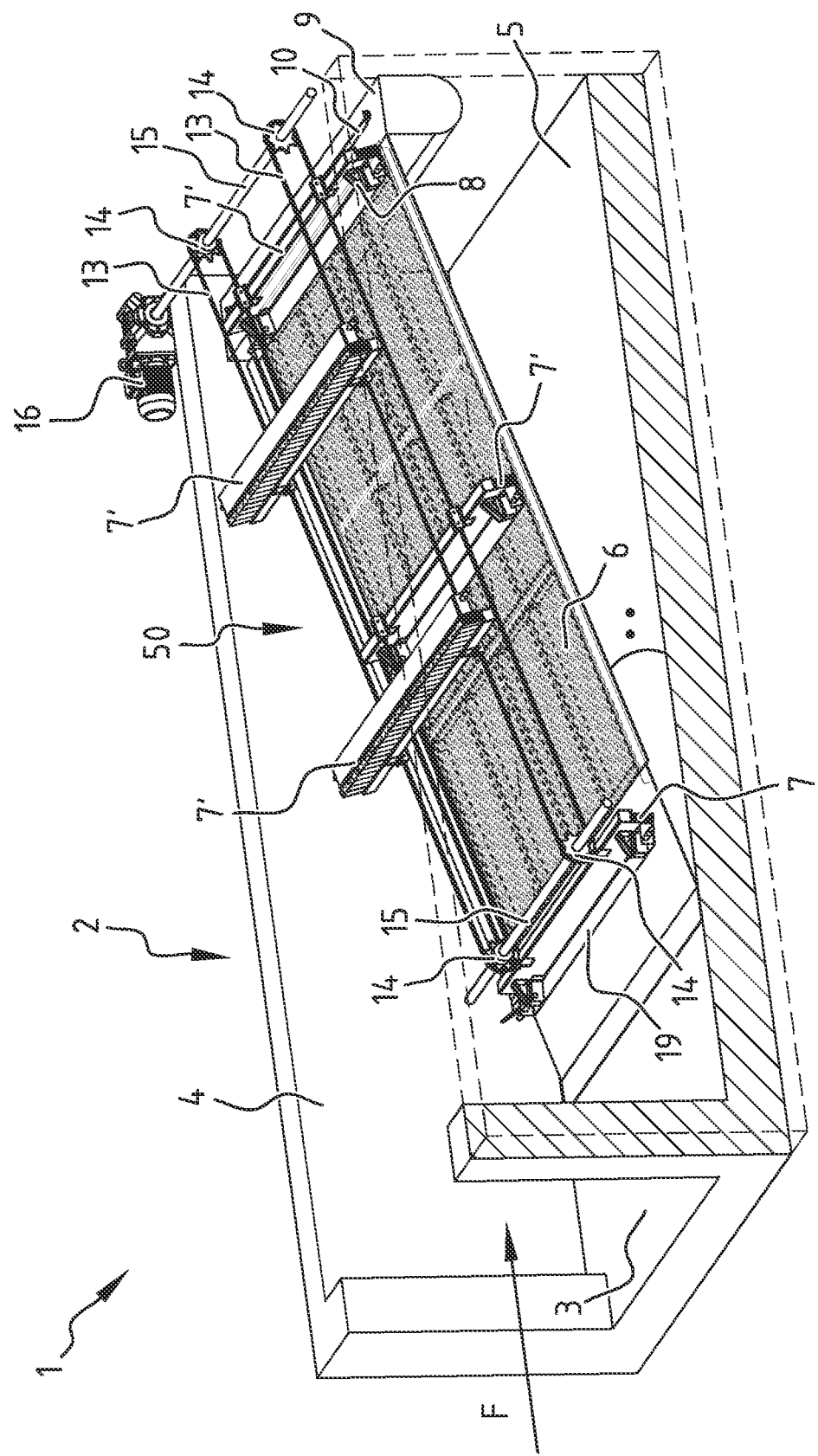
FIGS. 1A-1C schematically respectively show perspective, top and side views of a system for filtering fibrous material.
Figure 1B:
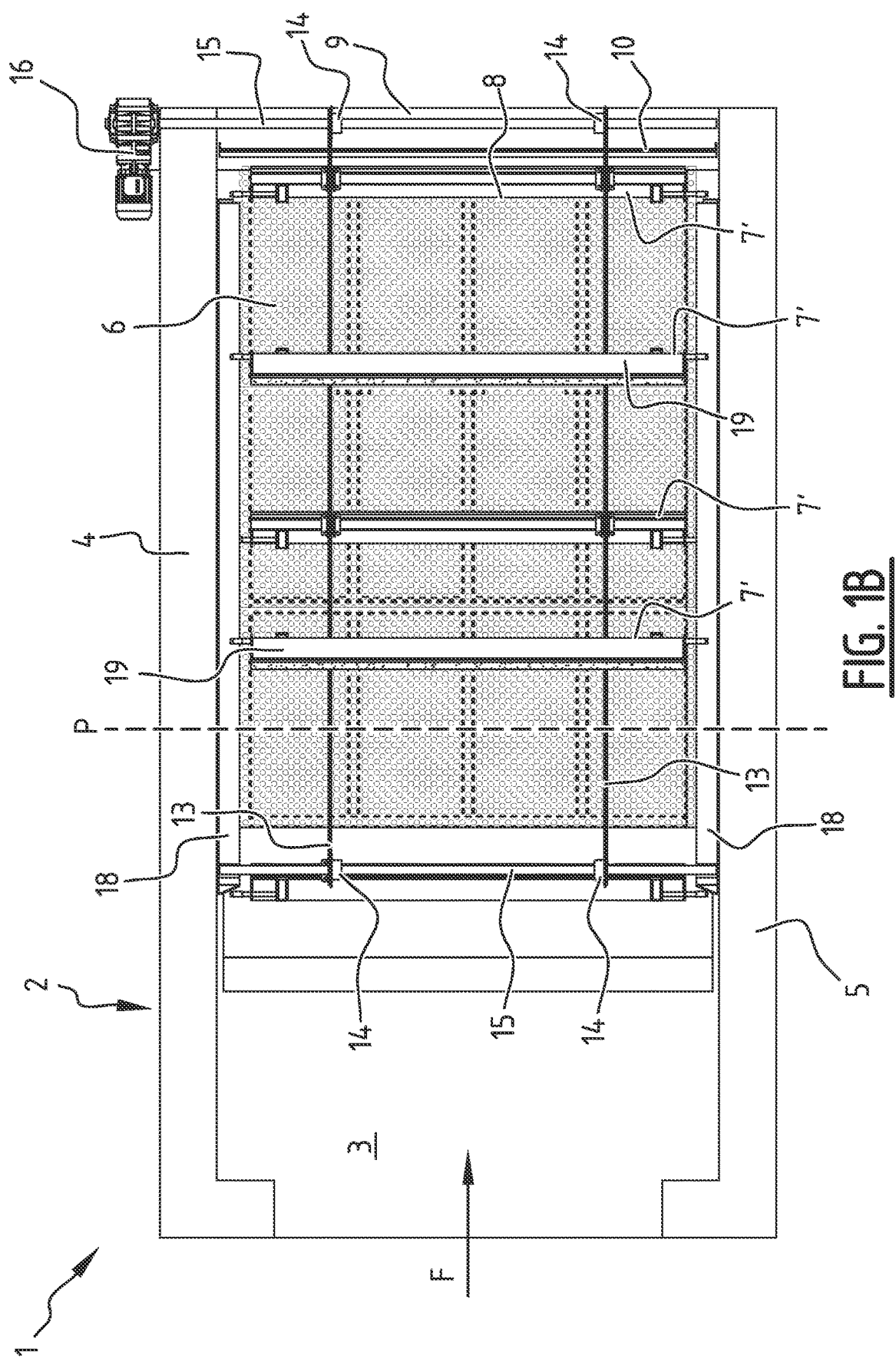
Figure 1C:
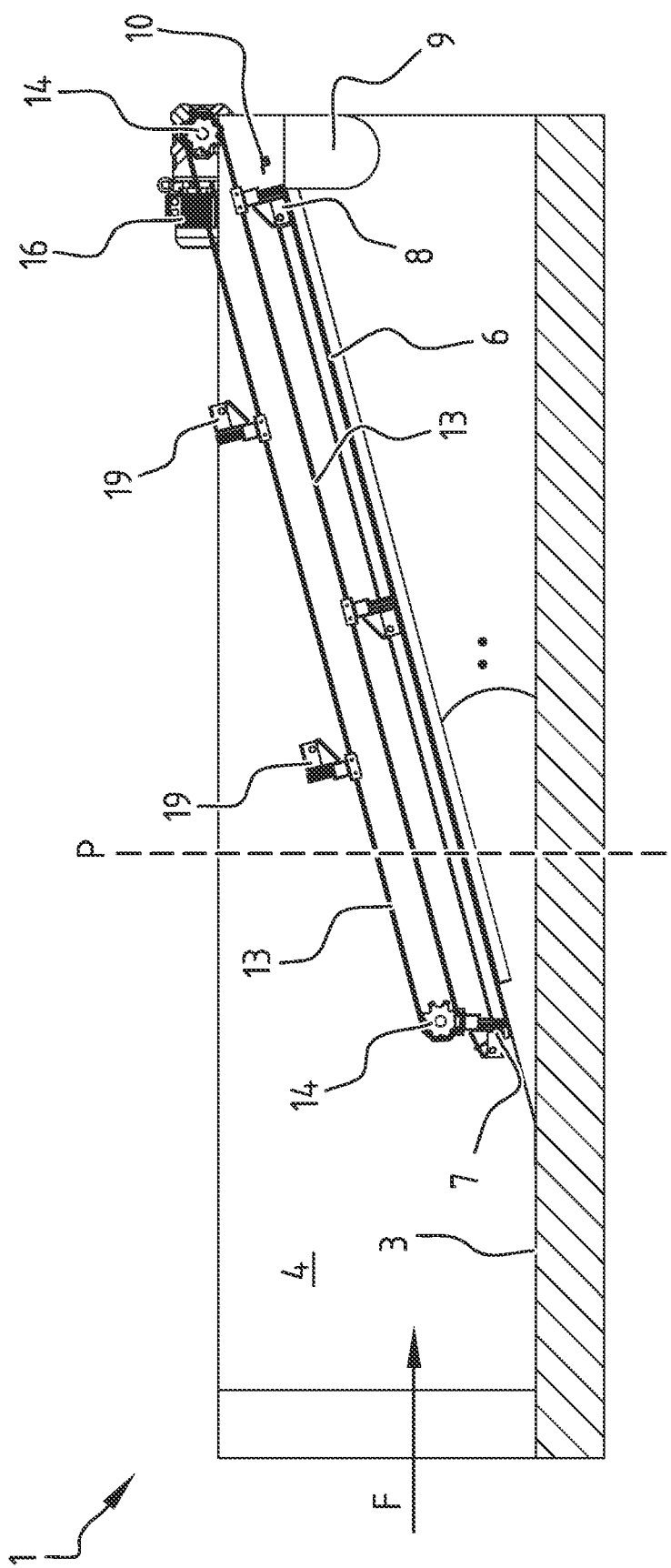

The figures show a system 1 for filtering fibrous material from water flowing through a channel 2. The channel 2 is herein formed by a concrete floor 3 and concrete walls 4, 5, which together define a u-shape as seen in transversal cross section of the channel 2. In the channel 2, a device 50 is installed for filtering fibrous material from water flowing through the channel 2. The device 50 comprises a sieve 6. The sieve 6 is flat, and is perforated with circular apertures having a diameter of 1.5 mm. The channel 2 defines a flow direction F, in the figures from left to right. The channel 2 shown herein, is arranged approximately horizontally. As such, the flow direction F is substantially horizontal. The sieve 6 is arranged at an angle α with respect to the flow direction F, in particular at an angle with the horizontal plane as seen in the flow direction F. The angle α is relatively small, in the chosen example 15°. Angles been 10° and 20° have been found to be desirable.

The sieve 6 is arranged in the channel 2 so that in order for water to pass through the channel 2, it has to pass through the sieve 6. As the sieve 6 is arranged relatively horizontally, i.e. the angle α between the sieve 6 and the horizontal is relatively small, a projection of the apertures of the sieve 6 in a vertical plane P normal to the flow direction F is relatively small. As such, the relatively large apertures of 1.5 mm diameter still effectively prevent fibrous material from passing through the sieve 6, while letting through a relatively large amount of water relatively easily.

During using, a filter cake builds up on the inlet side (i.e. upstream side) of the sieve 6. The filter cake consists of material, generally fibrous, that is unable to pass through the sieve 6. In order to prevent the filter cake from blocking water through flowing through the sieve 6, the device 50 comprises a wiper 7. In use, the wiper 7 moves over the sieve 6 in order to wipe the filter cake from it. To show the movement of the wiper 7, it is redrawn at several locations as wiper 7' along the path taken by the wiper. As such, the device 50 of the figures, actually only has one wiper 7. Nevertheless it is possible to use several wipers 7 if desired. Shown as an example, the wiper 7 is formed as a brush. The wiper 7 moves along the sieve 7 in the flow direction F, thereby wiping filtered material towards an upper end 8 of the sieve 6. Directly below the sieve 6 at its upper end 8 a receptacle 9 is arranged. The receptacle 9 catches filtered material deposited over the upper end 8 of the sieve 6 by the wiper 7. In order to skim filtered material from the wiper 7, a skimmer 10 is arranged near the upper end 8 of the sieve 6. The skimmer 10 is arranged stationary with respect to the channel 2 and the sieve 6 by mounting it to the walls 4, 5 of the channel 2. When moving, the wiper 7 passes the skimmer 10, thereby skimming filtered material off itself. As the skimmer 10 is arranged above the receptacle 9, skimmed material drops down into the receptacle 9.

Figure 2:
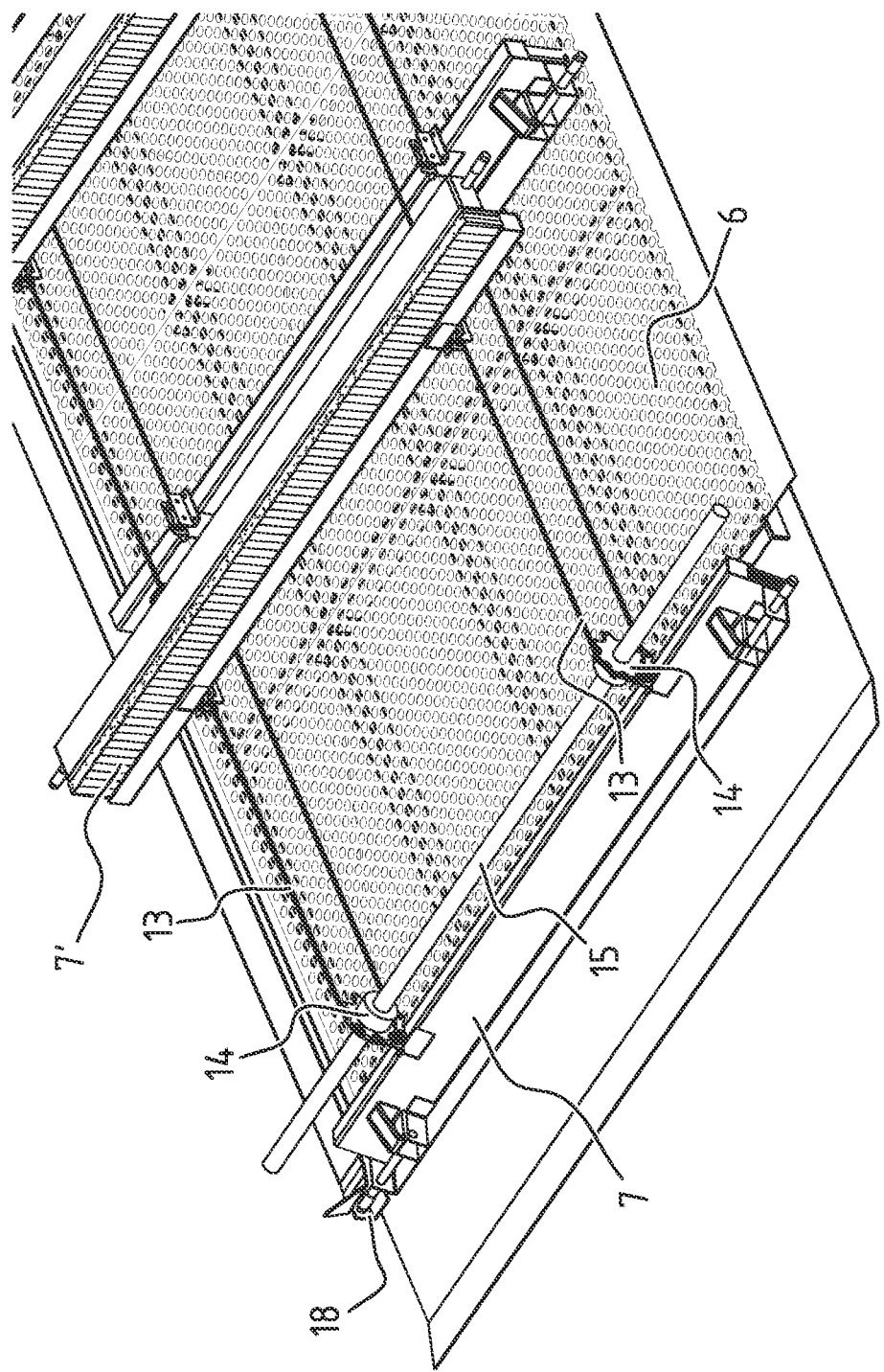
FIGS. 2 and 3 show details of parts of the system of FIGS. 1A-1C. Throughout the figures, like elements are referred to using like reference numerals.
Figure 3:
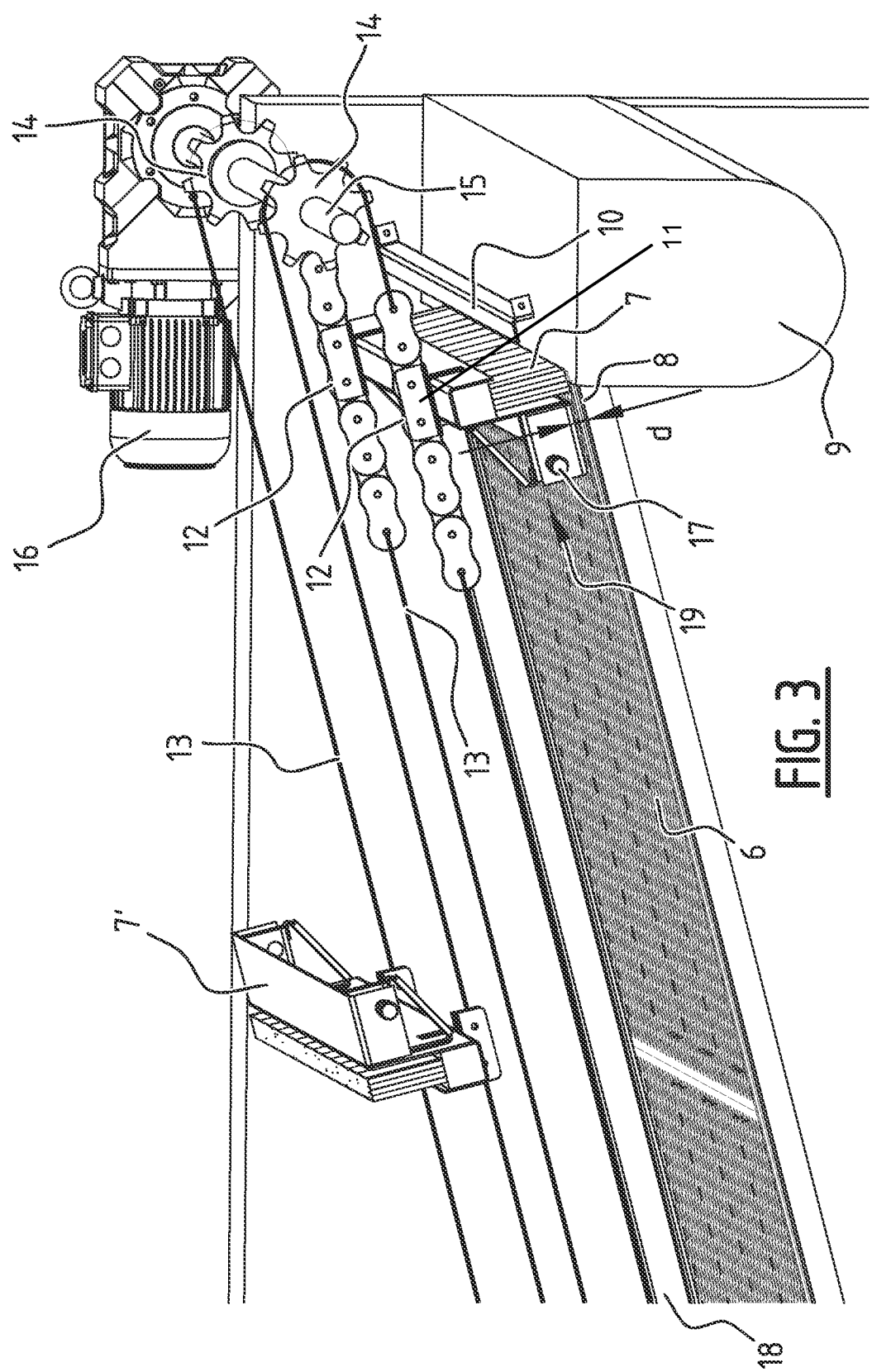

Movement of the wiper 7 is effected via a chain system. The wiper 7 is connected to two carriages 11. Each of the carriages 11 is connected to a chain link 12 of an endless chain 13. Each chain 13 is guided by two sprockets 14 supported on axles 15 near the lower and upper 8 end of the sieve 6. The axle 15 near the upper end 8 of the sieve 8 is driven by a synchronous electric motor 16. As such, the wiper 7 moves along the path of the chains 13 upwards along the sieve 6. The wiper 7 moves back towards the bottom of the sieve 6 at a distance thereof. In order to prevent the wiper 7 from tilting due to between the wiper 7 and the sieve, the wiper 7 is rigidly connected to a follower 17 on both its sides (see FIG. 2). The channel 2 is provided with a guide track 18 (see FIG. 3). The guide track 18 opens near the bottom of the sieve 6 (FIG. 2) in order to receive the followers 17. While the wiper 7 moves along the sieve 6, the guide track 18 prevents the wiper 7 form tilting with respect to the sieve 6 via the followers 17. The guide track 18 ends at the upper end 8 of the sieve 6, at a distance before the skimmer 10. As such, the wiper 7 is left free to tilt at the skimmer 10, thereby improving its skimming effect.

Directly aft of the wiper 7, as seen in the direction of movement thereof, and attached to the wiper 7, is a sieve cover 19. The sieve cover 19 moves with the wiper 7. The sieve cover 19 covers the sieve 6 directly aft of the wiper. The sieve cover 19 is flat and parallel to the sieve 7, at least while the wiper moves along the sieve 6. The sieve cover 19 moves at a distance d from the sieve 6, the distance being 1 cm, although smaller distances could be chosen.

The filter system 1 in the figures can be used for removing fibers from water, in particular for filtering municipal or industrial waste water.

The invention claimed is:

1. A method of installing a filtering device for filtering cellulosic fibers from water flowing through a channel, the method comprising:
   installing a sieve in the channel at an angle with respect to a flow direction defined by the channel, the sieve having an aperture size of from 0.8 mm to 10 mm, and
   wherein said angle is smaller than 25°, the method comprising allowing a buildup of filter cake on an inlet side of the sieve.

2. The method according to claim 1, further comprising manufacturing the sieve at a location different from the channel.

3. A method for removing cellulosic fibers from water, the method comprising:
   using a filtering device for removing the fibers from the water, the filtering device being for filtering fibers from water flowing through a channel, the device comprising:
   a sieve, the sieve arranged at an angle with respect a flow direction defined by the channel, the sieve having an aperture size of from 0.8 mm to 10 mm,
   wherein said angle is smaller than 25°, the method comprising allowing a buildup of filter cake on an inlet side said of the sieve.

4. The method of claim 3, wherein the water is municipal or industrial waste water.

5. The method of claim 3, wherein the sieve is flat.

6. The method of claim 3, the sieve comprising apertures of substantially circular shape.

7. The method of claim 3, wherein the sieve is fixedly connected to the channel.

8. The method of claim 3, wherein the filtering device further comprises at least one wiper which is movable over and/or across the sieve.

9. The method of claim 8, wherein the filtering device further comprises a skimmer for cleaning the wiper.

10. The method of claim 8, wherein the filtering device further comprises an actuator for moving the at least one wiper.

11. The method of claim 10, wherein the filtering device further comprises an endless support element configured to be driven in rotation by the actuator, the wiper being fixed with respect to the endless support element.

12. The method of claim 8, the filtering device further comprising means for preventing and/or limiting tilting of the wiper with respect to the sieve.

13. The method of claim 12, wherein the means for preventing tilting of the wiper comprise at least one follower mounted to the wiper and at least one guide track for guiding the at least one follower along the at least one track, the follower cooperating with the at least one track in order to prescribe an orientation of the wiper while the follower is guided by the track.

14. The method of claim 9, wherein the wiper is tiltably supported with respect to the skimmer at least while it is in contact with the skimmer.

15. The method of claim 3, wherein the channel is an open channel.

16. The method of claim 3, wherein the channel is made of concrete.

17. A method for removing cellulosic fibers from water, the method comprising:
   using a filtering device for removing the cellulosic fibers from the water, the filtering device being for filtering the cellulosic fibers from water flowing through a channel, the device comprising:

a flat and perforated sieve, the sieve being arranged at an angle with respect a flow direction defined by the channel, the sieve having an aperture size of from 0.8 mm to 10 mm, wherein said angle is smaller than 25°, the method comprising allowing a buildup of filter cake on an inlet side said of the sieve, wherein the filtering device further comprises at least one wiper which is movable over and/or across the sieve, the filtering device further comprising means for preventing and/or limiting tilting of the wiper with respect to the sieve.

18. The method of claim 17, wherein the means for preventing tilting of the wiper comprise at least one follower mounted to the wiper and at least one guide track for guiding the at least one follower along the at least one track, the follower cooperating with the at least one track in order to prescribe an orientation of the wiper while the follower is guided by the track.

19. The method of claim 17, wherein the filtering device further comprises a skimmer for cleaning the wiper, wherein the wiper is tiltably supported with respect to the skimmer at least while it is in contact with the skimmer.

20. The method of claim 17, wherein the filtering device further comprises an actuator for moving the at least one wipe, wherein the filtering device further comprises an endless support element configured to be driven in rotation by the actuator, the wiper being fixed with respect to the endless support element.

* * * * *